US008042247B2

(12) United States Patent
Dunkle et al.

(10) Patent No.: US 8,042,247 B2
(45) Date of Patent: Oct. 25, 2011

(54) METHOD FOR ASSEMBLING A TWO-PIECE PUNCH INTO A TOOL

(75) Inventors: Michael A. Dunkle, Smethport, PA (US); Jude D. Schlimm, Kersey, PA (US)

(73) Assignee: GKN Sinter Metals, Inc., Auburn Hills, MI (US)

( * ) Notice: Subject to any disclaimer, the term of this patent is extended or adjusted under 35 U.S.C. 154(b) by 654 days.

(21) Appl. No.: 12/157,536

(22) Filed: Jun. 11, 2008

(65) Prior Publication Data

US 2010/0299901 A1 Dec. 2, 2010

Related U.S. Application Data

(62) Division of application No. 11/115,830, filed on Apr. 26, 2005, now Pat. No. 7,393,194.

(51) Int. Cl.
*B23P 11/00* (2006.01)

(52) U.S. Cl. ... 29/407.09; 29/407.1; 29/465; 29/525.01; 249/59; 72/470

(58) Field of Classification Search ............... 29/407.09, 29/407.1, 419.1, 465, 525.01; 72/470, 471, 72/472, 481.1, 481.6, 482.2, 344; 425/78, 425/441, DIG. 58; 249/59
See application file for complete search history.

(56) References Cited

U.S. PATENT DOCUMENTS

| | | | | |
|---|---|---|---|---|
| 2,350,004 | A | 5/1944 | Whistler, et al. | |
| 2,364,835 | A | 12/1944 | Whistler, et al. | |
| 3,670,610 | A | 6/1972 | Cady, Jr. | |
| 3,788,118 | A | 1/1974 | Joseph | |
| 3,981,353 | A | 9/1976 | Knight | |
| 4,089,204 | A * | 5/1978 | Neilsen | 72/412 |
| 5,156,854 | A | 10/1992 | Yamada | |
| 5,366,363 | A | 11/1994 | Good et al. | |
| 5,392,512 | A | 2/1995 | Fann et al. | |
| 5,433,262 | A | 7/1995 | Kawaguchi et al. | |
| 5,755,271 | A | 5/1998 | Williamson | |
| 6,247,912 | B1 | 6/2001 | Sugimoto et al. | |
| 6,270,713 | B1 | 8/2001 | Crum et al. | |
| 6,305,458 | B1 | 10/2001 | Gligor | |
| 6,705,848 | B2 | 3/2004 | Scancarello | |
| 7,134,312 | B2 * | 11/2006 | Yamanaka et al. | 72/446 |

FOREIGN PATENT DOCUMENTS

| | | | |
|---|---|---|---|
| JP | 2061001 | A | 3/1990 |

* cited by examiner

*Primary Examiner* — Jermie Cozart
(74) *Attorney, Agent, or Firm* — Quarles & Brady LLP

(57) ABSTRACT

A tool for use in a powder metal process is disclosed. The tool includes an upper tool and a lower tool. The upper and lower tools may include multiple members for each tool. The lower tool having a predetermined cross sectional profile that continuously expands outward from or near a center point of the lower tool. The lower tool is also secured within a press for the powder metal process via a fastening mechanism.

9 Claims, 10 Drawing Sheets

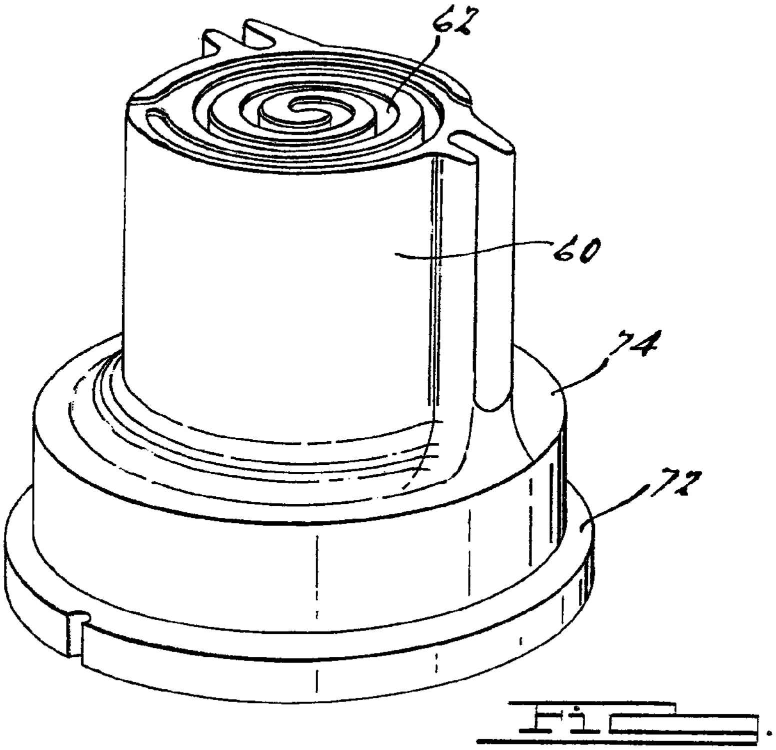
FIG. 2.
FIG. 3.
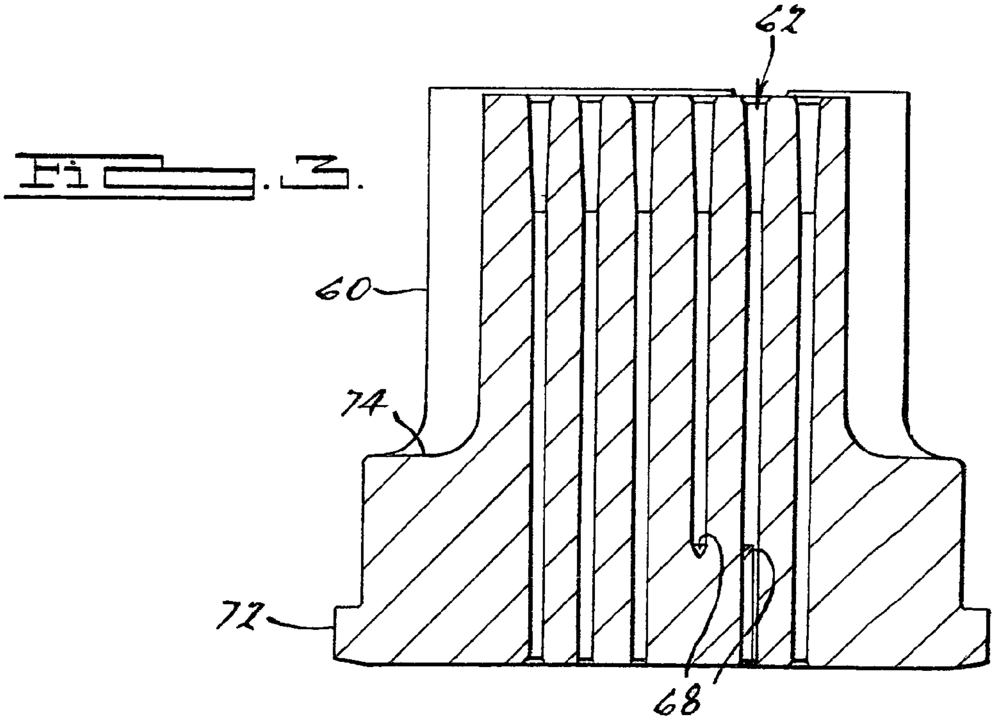

FIG. 25.
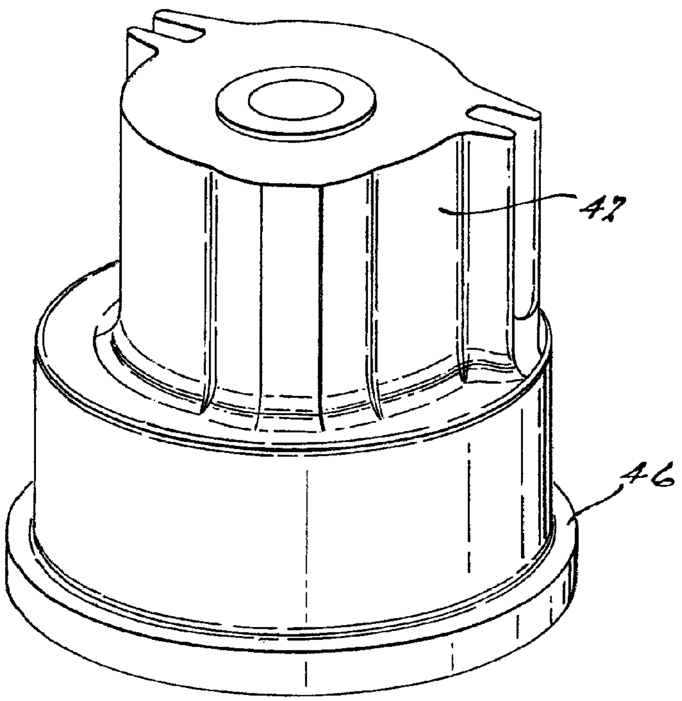
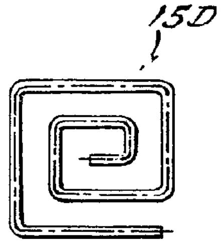
FIG. 26.
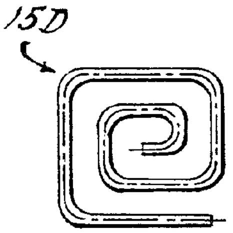
FIG. 27
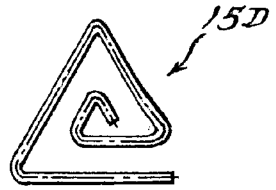
FIG. 28.
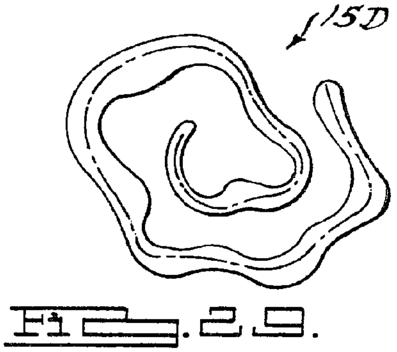
FIG. 29.
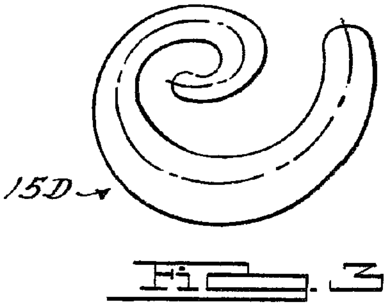
FIG. 30.

METHOD FOR ASSEMBLING A TWO-PIECE PUNCH INTO A TOOL

This is a divisional of application Ser. No. 11/115,830, filed Apr. 26, 2005 now U.S. Pat. No. 7,393,194 B2.

BACKGROUND OF THE INVENTION

1. Field of the Invention

The present invention generally relates to a powdered metal process, and more particularly relates to an improved tool for use in a powdered metal compaction process having unique geometries and assembly methodologies.

2. Description of Related Art

The powdered metal process is well known in the art. The powdered metal process generally compacts a blend of dry, powdered materials such as but not limited to metal powders, graphite, lubricants, and other materials, etc., into a rigid compact or presintered form. This rigid compact is then sintered at a temperature sufficient to bond together the individual metallic particles to provide a net or near net shaped part. These sintered parts, depending on the desired materials properties and/or part requirements, may have additional manufacturing operations subsequently performed on them in a manufacturing environment. The powdered metal process also includes a plurality of other equipment used to create a sintered powdered metal part. This includes apparatus and methodology for transferring material and products via hoppers and discharge apparatus to the tooling and other machining is necessary to make the sintered powdered metal part. Many of these apparatuses that handle the transferred material are capable of transferring powder, dust, grains, pellets, tablets, capsules, particulate matter and the like to the appropriate location in the sintered powdered metal process.

Many types of tooling are required for the powdered metal process to ensure correct formation of the sintered metal parts. These tooling members must approximate the desired part geometry even those capable of having multi-level shapes and geometries. These tooling members generally include a die, a core rod and top and bottom punches. This tooling is generally the most limiting factor in achieving specific part geometries due to the complexity and/or the ability to provide sufficient strength and rigidity to such tooling to survive the compaction process and the high forces under which such compaction must occur. Many of these prior art part geometries consist of a cross section profile that do not have shapes that extend from center points of the part being made and thus any such continuously expanding path outward from a center area will offer unique challenges to powdered metal tooling and assembly of such tooling. Depending on the type of apparatus being made and the geometry of the rigid compact or form a core rod may or may not be required within the tooling for the powdered metal process. However, it should also be noted that multiple core rods and/or multiple top or bottom punches may also be utilized in the powdered metal process. During a compaction cycle compressive, tensile and rupture forces act differently on the individual tool members. It is well known in the art that each member must have adequate strength and rigidity to withstand these forces or cause shut down of the line and/or manufacture of parts that are not precisely built to specific dimensions. Therefore, tooling must be designed, configured and assembled as a package to achieve the desired compact or formed geometry as well survive the rigors of the compaction process in the powdered metal process.

Compaction is one of the essential elements in the powdered metal process. The compaction process generally includes the following cycle. First there is a filling cycle where a blend of powdered material is placed into a cavity created via a specific tooling member. Next, a compacting step is done where the material particles are compressed together as tightly as possible. Next, is an ejecting step where the compact or form is pushed from the cavity. Many process parameters such as time, force, tooling positions and tool deflections are monitored, controlled and changed during each cycle via the use of a compaction press. The compaction press generally has tooling aligned on a similar axis to create such compacts or forms.

Therefore, many problems have occurred in the prior art powdered metal process with complex geometries that tend to extend from the center or near the center of the compact in outward or other various unique geometries. The creation of a die core rod and top and bottom punches to achieve such unique shapes, while the punches still have the requisite rigidity and strength has not easily been achieved. Many prior art powdered metal processes are just not capable of creating unique specific geometries other than those of basic shapes. Therefore, there is a need in the art for powdered metal tooling that is capable of unique powdered metal geometries that have unique non-traditional design features that have specific design characteristics such that metal parts can be produced via a powdered metal process. The use of such unique tooling in a powdered metal process will reduce the overall cost of the component via lighter components for the manufacturer, quicker manufacturing times and more precise control over exact dimensional requirements for a powdered metal part.

SUMMARY OF THE INVENTION

One object of the present invention may be to provide improved powdered metal tooling.

Another object of the present invention may be to provide an improved assembly methodology for powdered metal tooling.

It may still be another object of the present invention to provide powdered metal tooling that has unique powdered metal geometry wherein that geometry has a cross sectional profile that may or may not be uniform along its path.

It may still be another object of the present invention to provide a unique powdered metal geometry that follows a path that continuously and generally expands outward from a center location or near center location of the tooling.

It may still be another object of the present invention to provide improved assembly and securing techniques for tool members in a compaction press to provide adequate tooling strength and rigidity as applied to the unique geometry of the present invention.

It may still be another object of the present invention to provide a more precise and shorter manufacturing time for unique geometry metal parts by using the techniques of the present invention.

To achieve the foregoing objects a tool for use in a powdered metal process is disclosed. The powdered metal process tooling includes an upper tool and a lower tool. The lower tool has a predetermined cross sectional profile that continuously expands outward from or near a center point of the lower tool. The upper and lower tools may consist of multiple tooling members.

One advantage of the present invention may be that it provides an improved unique geometry tool for a powdered metal process.

Still another advantage of the present invention may be that it provides a unique two piece lower punch for used in a powdered metal process.

Yet a further advantage of the present invention may be that it provides a unique assembly and methodology of securing a punch in a powdered metal process.

It still may be another advantage of the present invention to create a unique geometry for powdered metal tooling that is capable of any known shape and different profiles and thicknesses.

It may yet be another advantage of the present invention to use strengthening webs in a punch in a powdered metal press.

Still another advantage of the present invention may be a more durable, rigid, and precise powdered metal compact press for use in a variety of manufacturing environments.

Still another advantage of the present invention may be the methodology of assembling a two-piece punch for a powdered metal process.

Other objects, features and advantages of the present invention may become apparent from the subsequent description, taken in conjunction with the accompanying drawings.

BRIEF DESCRIPTION OF THE DRAWINGS

FIG. 2 is a perspective view of an outer bottom or lower punch according to the present invention.

FIG. 3 shows a cross section of an outer bottom or lower punch according to the present invention.

FIG. 25 shows a top punch for use in a powdered metal process according to the present invention.

FIG. 26 shows an alternate cross sectional uniform profile for the present invention.

FIG. 27 shows an alternate embodiment of a cross sectional non-uniform profile for use in tooling according to the present invention.

FIG. 28 shows an alternate embodiment cross sectional profile for use in the tooling of the present invention.

FIG. 29 shows an alternate embodiment of a cross sectional non-uniform profile for use in the tooling of the present invention.

FIG. 30 shows a cross sectional non-uniform profile for use in the tooling of -the powdered metal process according to the present invention.

DESCRIPTION OF THE PREFERRED EMBODIMENT(S)

Figure 1:
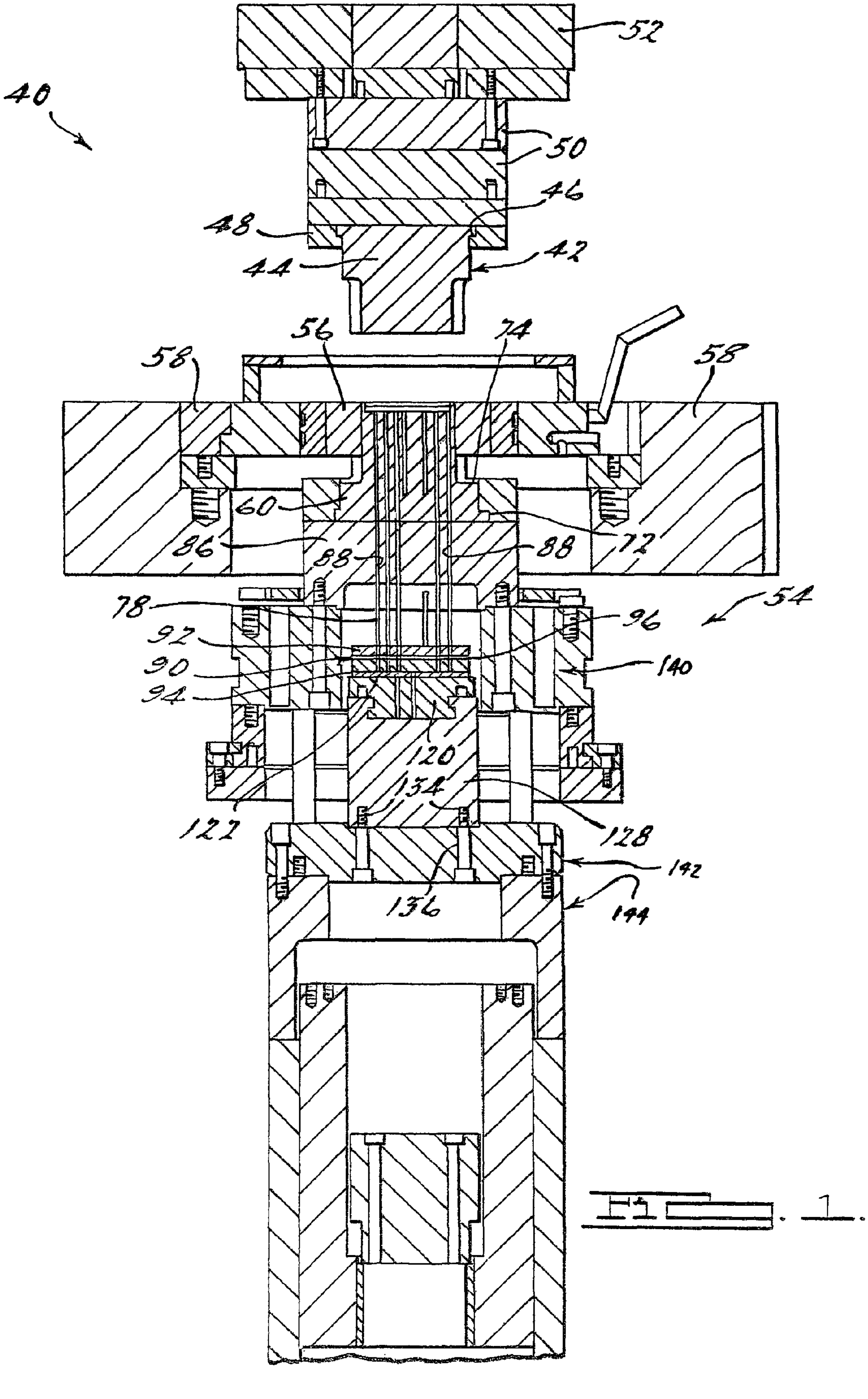
FIG. 1 shows a cross sectional view of the tooling for a powdered metal press according to the present invention.

Referring to the drawings, a powdered metal press having tooling 40 according to the present invention is shown. It should be noted that the tooling 40 can be used for any known powdered metal processing technique or methodology. The tooling 40 shown in the drawings is for a unique powdered metal geometry but any other unique powdered metal geometry may also be used and designed for the tooling 40 as described. The restriction of the drawings to a single unique powdered metal geometry in no way effects the ability of the tooling 40 to be made for other specific unique powdered metal geometries. Therefore, any other known or unknown powdered metal geometry that has a unique shape or traditional shape may also be used with the tooling and techniques as described herein.

FIG. 1 shows the tooling 40 for use in a compaction press for a powdered metal process. The other portions of the powdered metal process including the complete press, the hopper and delivery methods of the powdered materials to the press and the delivery of the compact or pre-sintered formed parts to a sintering over are not shown. It should be noted that FIG. 1 shows a tooling 40 with a one piece top punch 42. However, it is contemplated to have a multiple piece or member top or lower punch. Therefore, any type of multiple member or piece upper or lower punch or tooling may be possible in the present invention.

FIGS. 1 and 25 show an upper or top punch 42 according to the present invention. The punch 42 generally has a solid body 44 with a unique shape that matches that of the unique geometry part being made in the sintered powdered metal process. The upper punch 42 has a circumferential flange 46 at one end thereof. The circumferential flange 46 is arranged within a punch holder 48 which is connected to a plurality of spacers or flanges 50 to a top portion 52 of the powdered metal press. The upper punch 42 is generally capable of movement along an axis on the center point of the upper punch 42. The movement of the punch 42 will allow for compaction of the powdered metals into the desired part shape. However, it should be noted that in contemplated embodiments the upper punch 42 will be generally fixed and the lower punch will do all movement necessary for the compaction process in the compaction press of the powdered metal process. It should be noted that the spacers and flanges 50 are connected to the sinter metal press by any known fasteners or any other well known fastening technique, including but not limited to chemical, mechanical, electro mechanical binding or fastening methodologies. It should be noted that the punch 42 is generally made of a steel material however any other metal, hard ceramic, plastic, composite, rubber, material, etc., may also be used for the top or upper punch 42 depending on the design requirements and manufacturing environment for the powdered sinter metal process. As discussed above the upper tool 42, as shown in FIG. 1 and FIG. 25, has a specific geometry for the part being made with this specific unique tooling. In this case the tooling is a scroll for a compressor for use in refrigeration, automobiles or other manufacturing components.

FIG. 1 also shows the lower tool portion 54 of the compaction press for the powdered metal process. The lower tool 54 of the compaction press includes a die 56. The die 56 generally has any known shape in this case it is a circumferential shape. The die 56 will be capable of receiving the powdered metal particles. The die members generally have the shape of the part being made by the powdered metal and sintering process. The tooling 40 as shown in FIG. 1 is in the open or pre-filling stage. A plurality of flanges 58 are attached to the dies 56 to allow for connection of the die 56 to the lower portion 54 of the sinter metal press. It should also be noted that all of the parts described in the application are generally made of a steel material. However any other known metal, hard plastic, ceramic, composite or the like material may also be used for any of the tooling parts and press parts of the powdered metal process as described herein.

Figure 4:
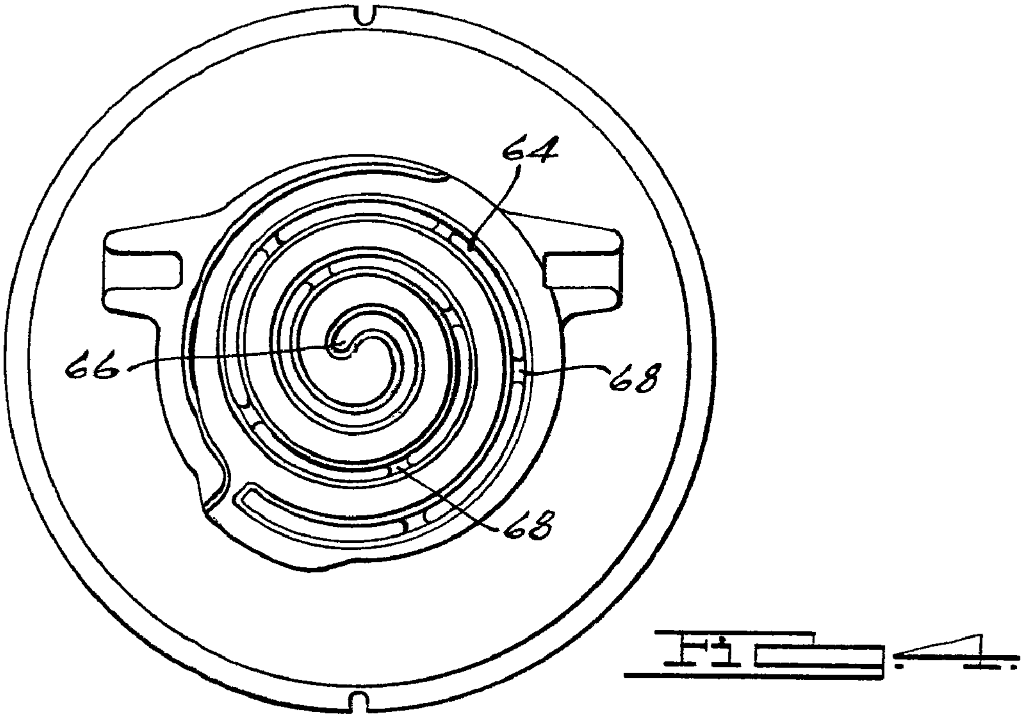
FIG. 4 shows a top view of an outer bottom or lower punch according to the present invention.

FIGS. 1 and 2 through 4 show an outer bottom or lower punch 60 according to the present invention. The outer bottom or lower punch 60 includes a cavity 62 and multiple levels that mimic that of the powdered metal part being processed. In the case shown, the cavity 62 of the outer bottom punch 60 is in the shape of a scroll. This unique shape consists of generally two essential elements. The first is a cross sectional profile that may or may not be uniform along its path 64. The second is that the path continuously and generally extends outward from a center location 66 of the lower punch 60. It should be noted that the path 64 that extends outward from the center location 66 may also extend outward from a point near a center location 66 or it may extend from multiple points near, far from or at the center location 66. The cavity 62 generally extends through the entire length of the outer bottom punch 60 as shown in FIG. 3. However, it should be noted, as also shown in FIG. 3, that the cavity 62 includes a plurality of strengthening webs 68 as shown in both FIG. 3 and FIG. 4 which are placed at predetermined positions between two adjacent walls of the outer bottom punch 60 depending on the design of the unique geometry. In the scroll shape shown the plurality of webs 68 are placed between the walls to increase rigidity and strength of the outer bottom punch 60 for the repeated use of the punch 60 in the compaction process. As shown in FIG. 3 the webs 68 extends a predetermined distance in an upward direction from the bottom portion of the outer bottom punch 60. The webs 68 also have a predetermined thickness which may be varied depending on the strength required and the design requirements for the outer bottom punch 60. It should be noted that the design shown for the unique geometry of the tooling 40 in FIGS. 2 through 4 is that of a scroll shape however any other shape 150, such as those shown but not limited to in FIGS. 26 through 30 may also be used. These shapes 150 either have a uniform or non-uniform cross section and may have the form of a rectangle, square, triangle, polygon, oval, etc., extending from or near a center point 66 of the tooling. It may also be a random shape that has no known particular or specific shape in cross section or profile. The outer bottom punch 60 also includes a circumferential flange 72 at one end thereof and a shoulder 74 at another predetermined position thereon. The circumferential flange 72 and shoulder 74 will be used to attach to plurality of flanges or spacers in the lower tool unit 54 which is used to attach the punch 60 to the powdered metal press.

Figure 5:
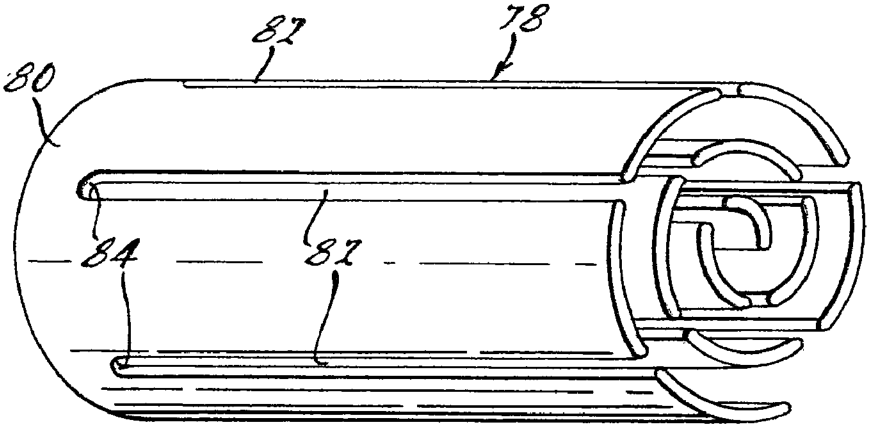
FIG. 5 shows a perspective view of an inner bottom or lower punch according to the present invention.
Figure 6:
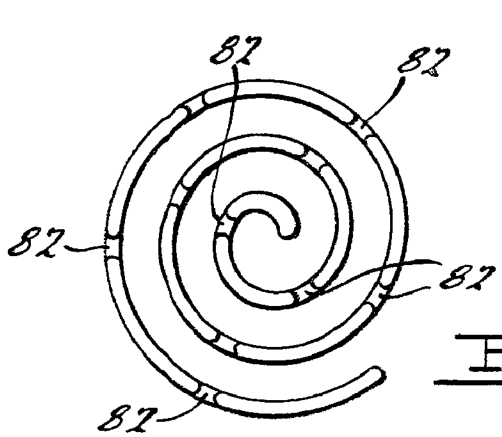
FIG. 6 shows an end view of an inner bottom or lower punch according to the present invention.
Figure 7:
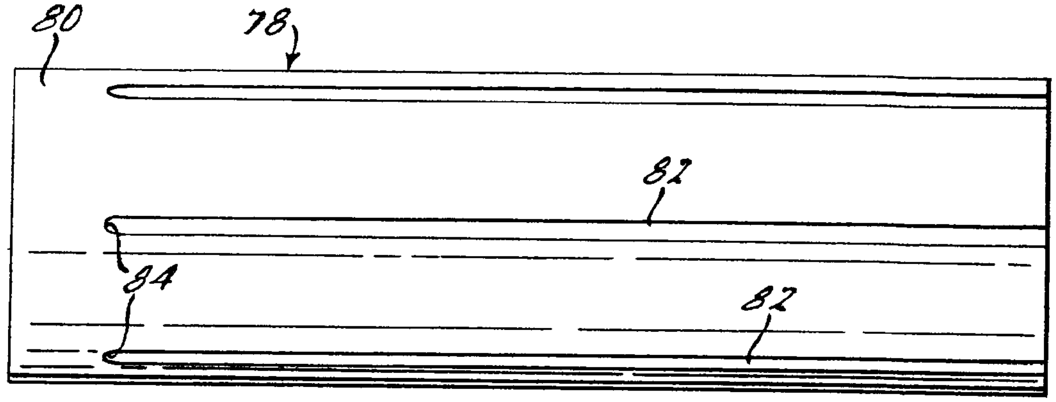
FIG. 7 shows a side view of an inner bottom or lower punch according to the present invention.
Figure 8:
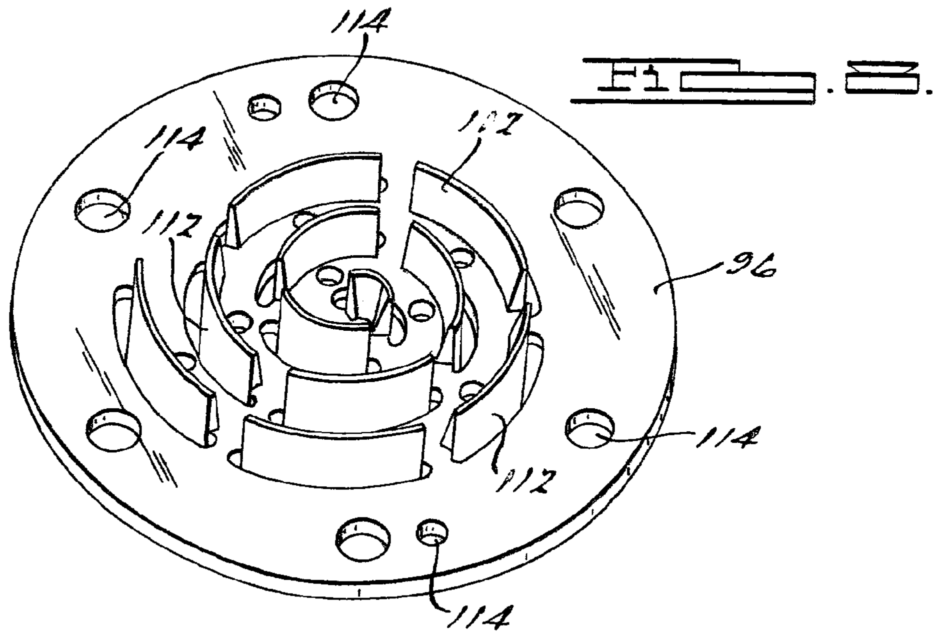
FIG. 8 shows a perspective view of a clamp spike member according to the present invention.
Figure 9:
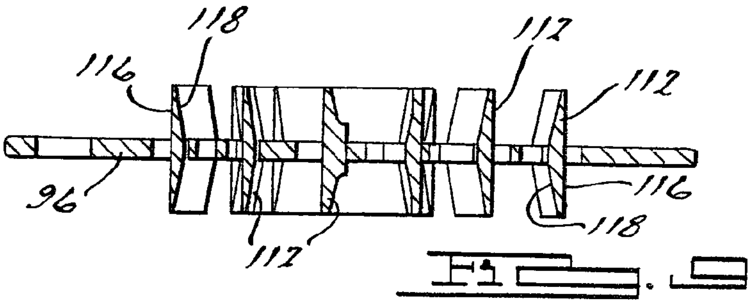
FIG. 9 shows a cross section of the clamped spiked member taken along line 9-9 of FIG. 10.
Figure 10:
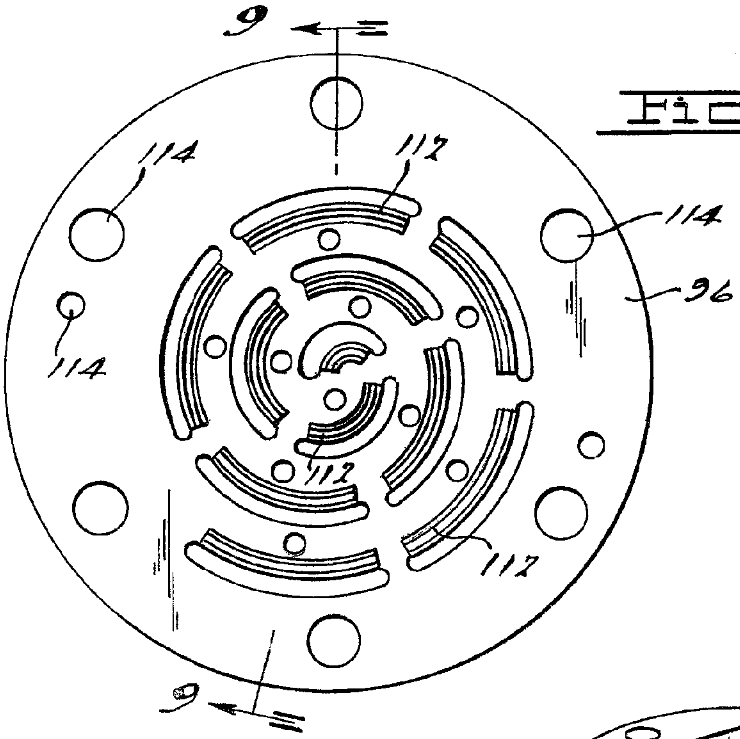
FIG. 10 shows a top view of a clamped spiked member according to the present invention.
Figure 11:
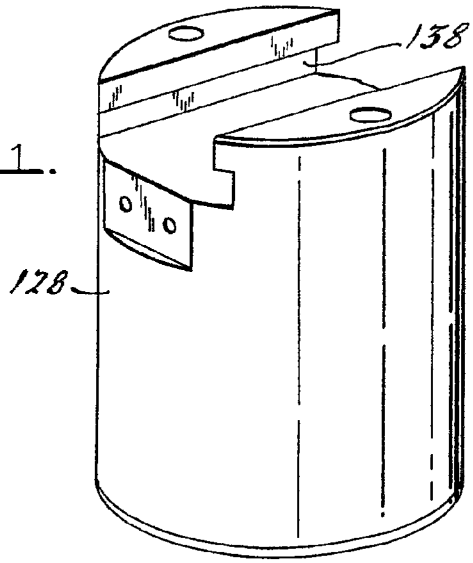
FIG. 11 shows a perspective view of a punch holder according to the present invention.
Figure 12:
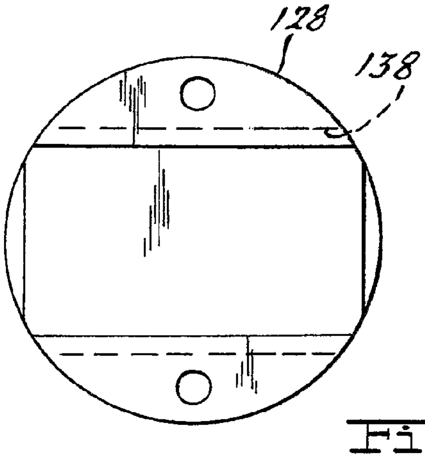
FIG. 12 shows a top view of a punch holder according to the present invention.
Figure 13:
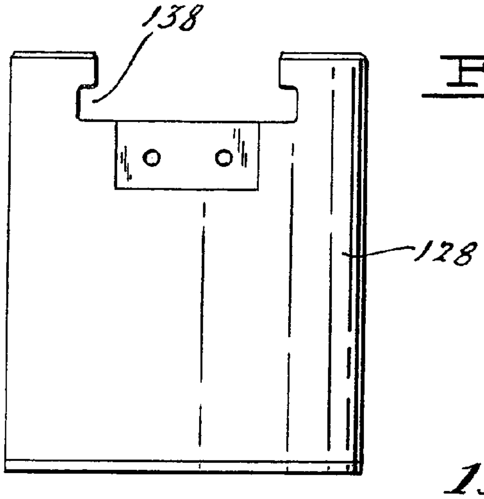
FIG. 13 shows a side view of a punch holder according to the present invention.

FIG. 1 and FIGS. 5 through 7 show an inner bottom or lower punch 78 according to the present invention. The inner bottom punch 78 is arranged within the outer punch 60. The inner bottom punch 78 is placed within the outer bottom punch 60 from the top side of the outer bottom punch 60. The inner bottom punch 78 generally has a cylindrical shape. The shape as that shown in FIGS. 5 through 7 is that of a rolled piece of paper or a scroll. This tube like scroll shape has a solid ring like portion 80 at one end thereof. It should be noted that any of the other shapes shown, otherwise contemplated, unknown or known may also be converted into an inner bottom punch 78 as shown in FIG. 5 through 7. The inner bottom punch 78 includes a plurality of grooves or channels 82 extending lengthwise from one end of the inner bottom punch 78 to a predetermined distance from the opposite end of the outer bottom punch 60. The predetermined distance is that that provides the solid ring like shape 80 as described above. The plurality of grooves 82 in the inner bottom punch 78 align with and interact with the strengthening webs 68 located in the outer bottom punch 60. Thus, when the inner bottom punch 78 is inserted into the outer bottom punch 60, via the top of the outer bottom punch 60, the inner bottom punch 78 is placed in such that the grooved end is inserted first and the grooves 82 are aligned with the strengthening webs 68 and the inner bottom punch 78 is moved in the axial direction along the axis of the outer bottom punch 60 until the end 84 of the plurality of grooves 82 contact and engage with strengthening webs 68 of the outer bottom punch 60. In its assembled position the two-piece punch formed by the outer lower punch 60 and the inner lower punch 78 has the inner lower punch 78 extending beyond an end of the outer lower punch 60 a predetermined distance. It should be noted that any of the cross sectional profiles described herein or any other known or unknown cross sectional profile can be designed into the outer bottom punch 60 and the inner bottom punch 78. The precise number of strengthening webs 68 and grooves 82 in the outer bottom punch 60 and inner bottom punch 78, respectively, will vary depending on the design requirements and forces encountered during the compaction process for the specific sinter metal parts.

FIG. 1 shows a lower punch support member 86 arranged directly below the outer bottom punch 60. The lower punch support member 86 has a plurality of orifices 88 therethrough that align with the inner bottom punch 78. The inner bottom punch 78 is arranged through the outer bottom punch support 86 as shown in FIG. 1. The outer bottom punch support 86 is then connected to a plurality of support members 140 as shown in FIG. 1.

Figure 14:
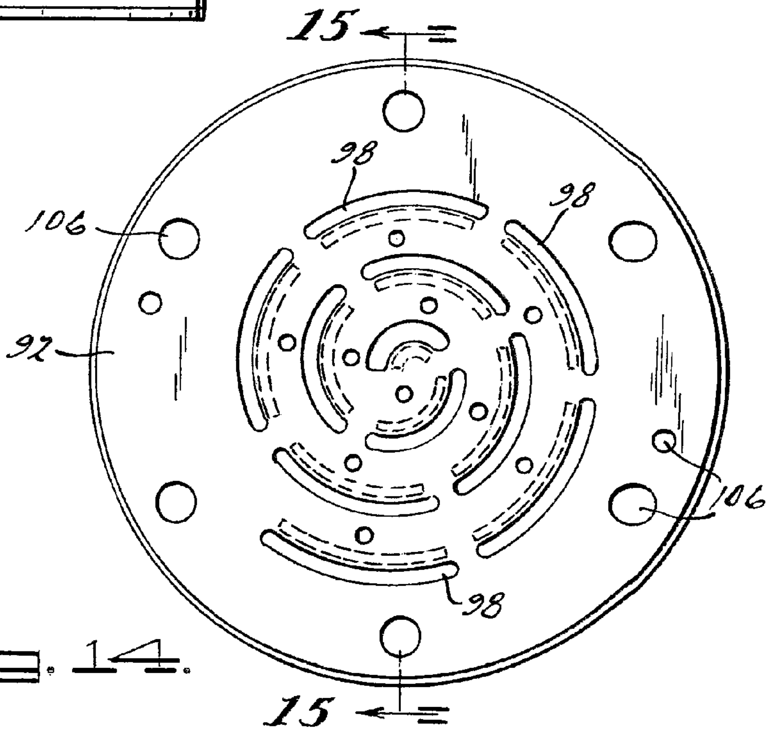
FIG. 14 shows an upper clamp for use in a press according to the present invention.
Figure 15:
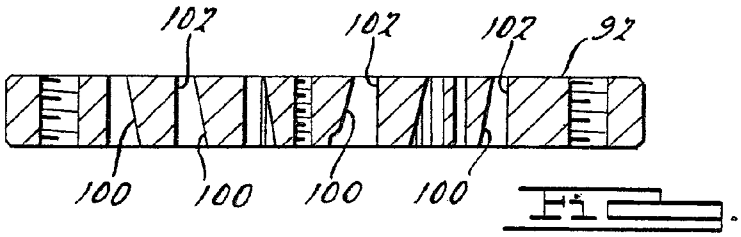
FIG. 15 shows a cross section of the upper clamp taken along line 15-15 of FIG. 14.
Figure 16:
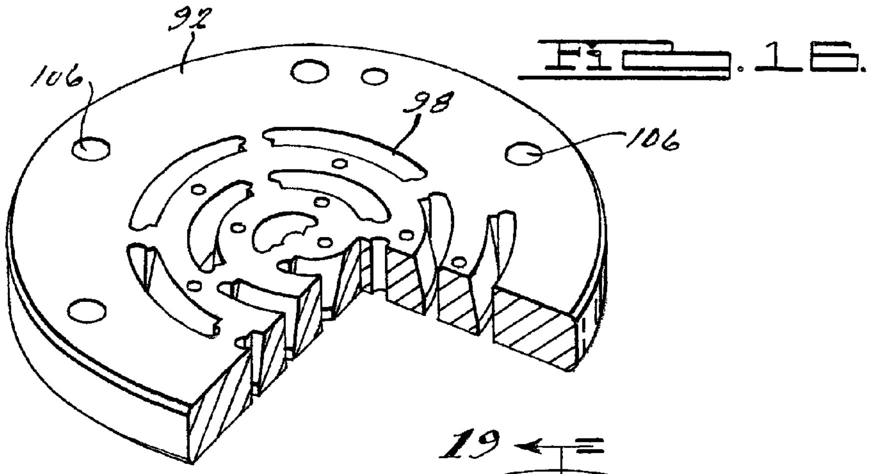
FIG. 16 shows a partial cutaway of an upper clamp according to the present invention.

FIG. 1 along with FIGS. 8 through 10 and 14 through 19 show a clamping mechanism 90 for use in the tooling according to the present invention. The clamping mechanism 90 has one end of the inner bottom punch 78 arranged therein. The clamping mechanism 90 may be any known clamping mechanism that is capable of securing and engaging the lower portion of the inner bottom punch 78 via any known mechanical, chemical, electronic, adhesive, welding, electro-mechanical, laser welding technique, etc. The clamping mechanism 90 as shown in the drawings generally includes an upper clamp member 92 and a lower clamp member 94 with a clamp spike member 96 arranged between the upper 92 and lower clamp member 94. The upper and lower clamp members 92, 94 and spike member 96 generally have circular shapes. However, any other shape known may be used depending on the design requirements and environmental concerns for the compaction press. The upper clamp 92, generally as shown in FIGS. 14 through 16, has a plurality of orifices 98 therethrough that is generally similar to the shape of the inner bottom punch 78. In the tool shown, it is that of a scroll shape. However, any other shape and geometry may also be placed through the upper clamp 92. It should be noted that the upper clamp 92 may have surfaces 100 that have predetermined angles thereon for use in attaching the inner lower punch 78 to the powdered metal press. As shown in FIGS. 15 and 16 the angled surfaces 100 occur within predetermined orifices 98 while some orifices 98 have generally straight surfaces 102 with no angles thereon thus having a generally perpendicular relation to a top surface of the upper clamp 92.

Figure 17:
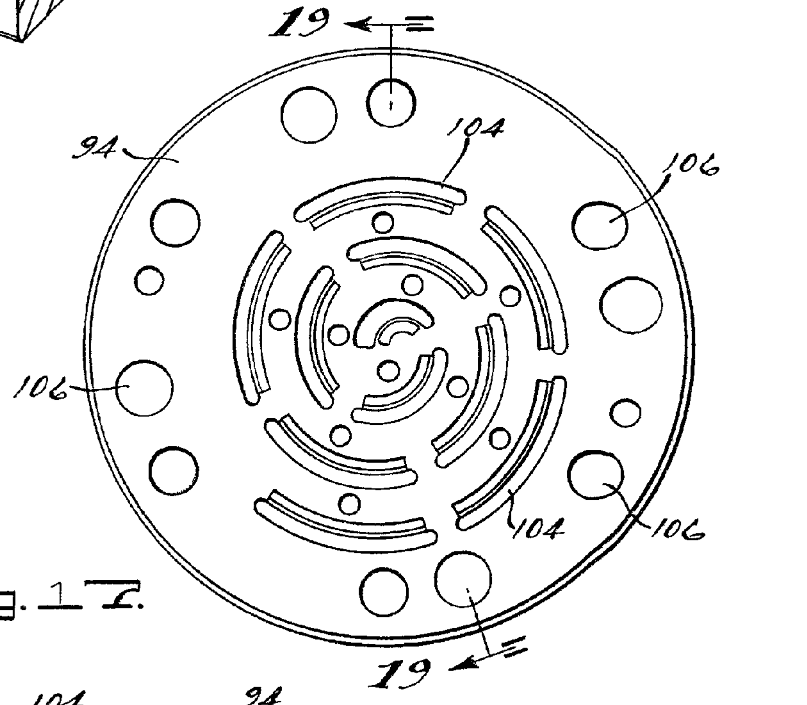
FIG. 17 shows a top view of a lower clamp according to the present invention.
Figure 18:
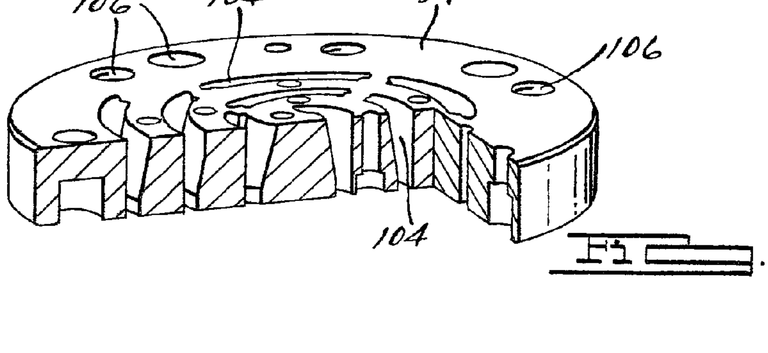
FIG. 18 shows a partial cutaway of a lower clamp according to the present invention.
Figure 19:
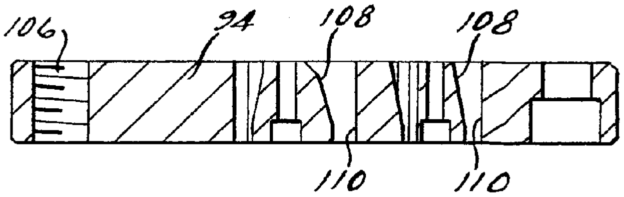
FIG. 19 shows a cross section of a lower clamp taken along line 19-19 of FIG. 17.
Figure 20:
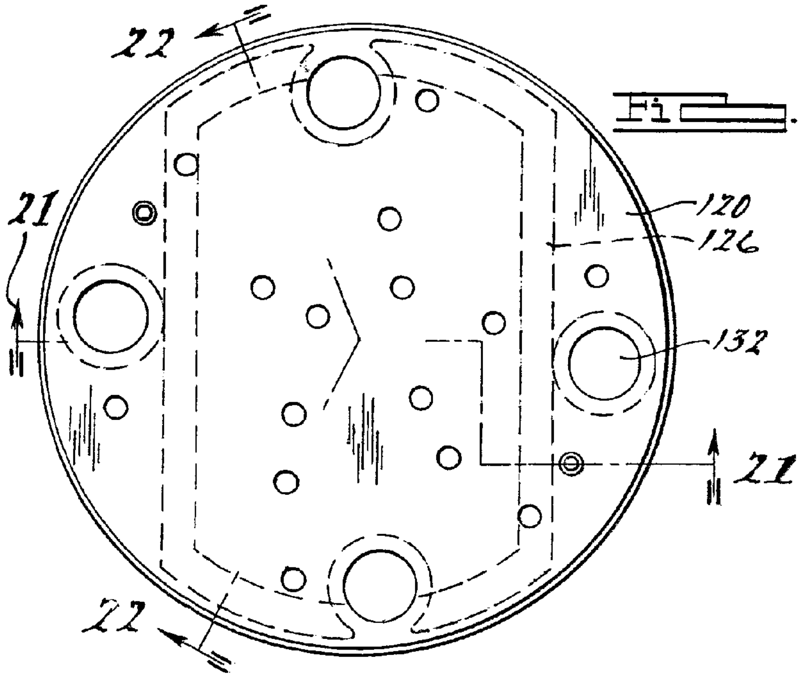
FIG. 20 shows a top view of a punch backing member according to the present invention.

The lower clamp 94, as shown in FIGS. 17 through 19, generally has the same or similar shape of the upper clamp 92 and includes a plurality of orifices 104 therethrough that is generally similar to the shape of the inner bottom punch 78, in this case a scroll shape. There also are other orifices 106 through the surface of both the upper 92 and lower clamp 94 which are used to connect the upper 92 and lower clamp 94 to one another and allow for tightening of the upper and lower clamps 92, 94 with respect to one another in an axial direction. As is also shown in FIGS. 18 and 19 some of the orifices 104 of the lower clamp 94 have angled surfaces 108 thereon, while others have straight surfaces 110 as described above.

The clamp spike member 96 which is arranged between the upper and lower clamp members 92, 94 generally has a disk like body with a plurality of locking members 112 extending from one or both ends thereof. The locking members 112 generally are similar to that of the inner lower punch 78 and in our case is a scroll like shape. There also is a plurality of connecting orifices 114 which are used to allow for fasteners and other aligning members to pass between the upper and lower clamps 92, 94 and clamps spike member 96 for necessary connection of members to form a clamping mechanism 90. The locking members 112 generally have an angled surface 116 on one side thereof and a flat or vertical surface 118 on the opposite side. This will allow for the angled surfaces 116 to interact and interengage with the angled surfaces 100, 108 on the lower and upper clamp members 92, 94. The flat surfaces 118 will interengage with the relatively flat surfaces of the inner bottom punch 78. Thus, after the inner bottom punch 78 is placed through the orifices 98, 104 of the upper and lower clamp members 92, 94 and clamp spike member 96, the interaction between the angled surfaces of the upper and lower clamp 92, 94 and the locking members 112 of the clamp spike member 96 will interact during tightening of the lower clamp 94 to the upper clamp 92 in an axial direction. This interaction of the angled surfaces will move the locking members 112 in a radial direction thus engaging and interacting with the surfaces of the inner bottom punch 78 to create a holding force between the inner bottom punch 78 and a locking member 112 and a locking surface of the clamping mechanism 90 on the opposite side of the inner bottom punch 78. This will hold the inner bottom punch 78 at a predetermined position with respect to the axis of the powdered metal press. The amount of tightening between the lower and upper clamp 92, 94 will determine the amount of force used to hold the punch in its predetermined position. It should be noted that any other known or unknown clamping or fastening technique may also be used other than the one that is described therein.

Figure 21:
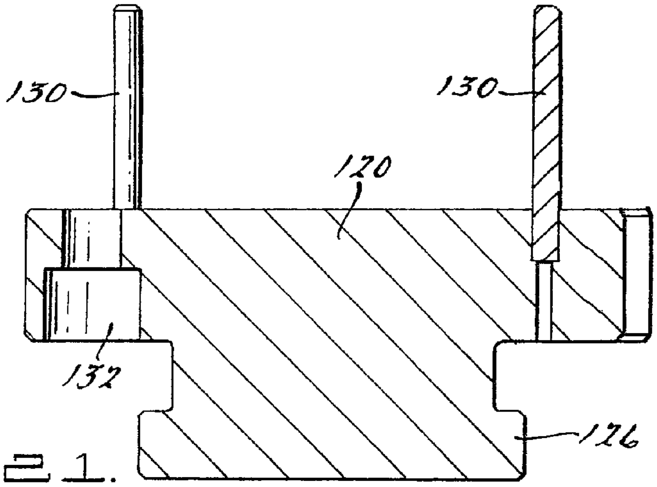
FIG. 21 shows a cross section of the punch backing member taken along line 21-21 of FIG. 20.
Figure 22:
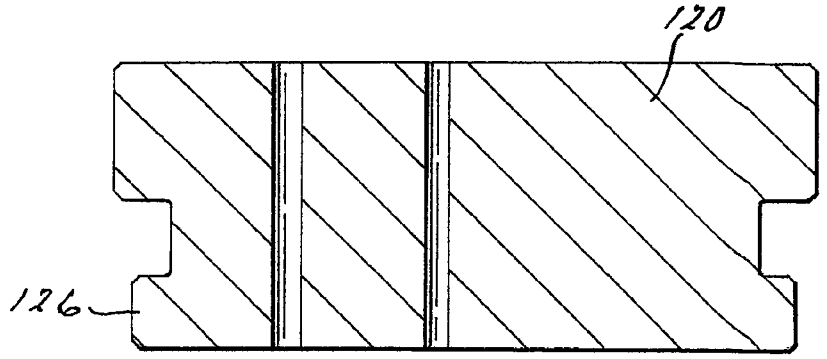
FIG. 22 shows a cross section of the punch backing member taken along line 22-22 of FIG. 20.
Figure 23:
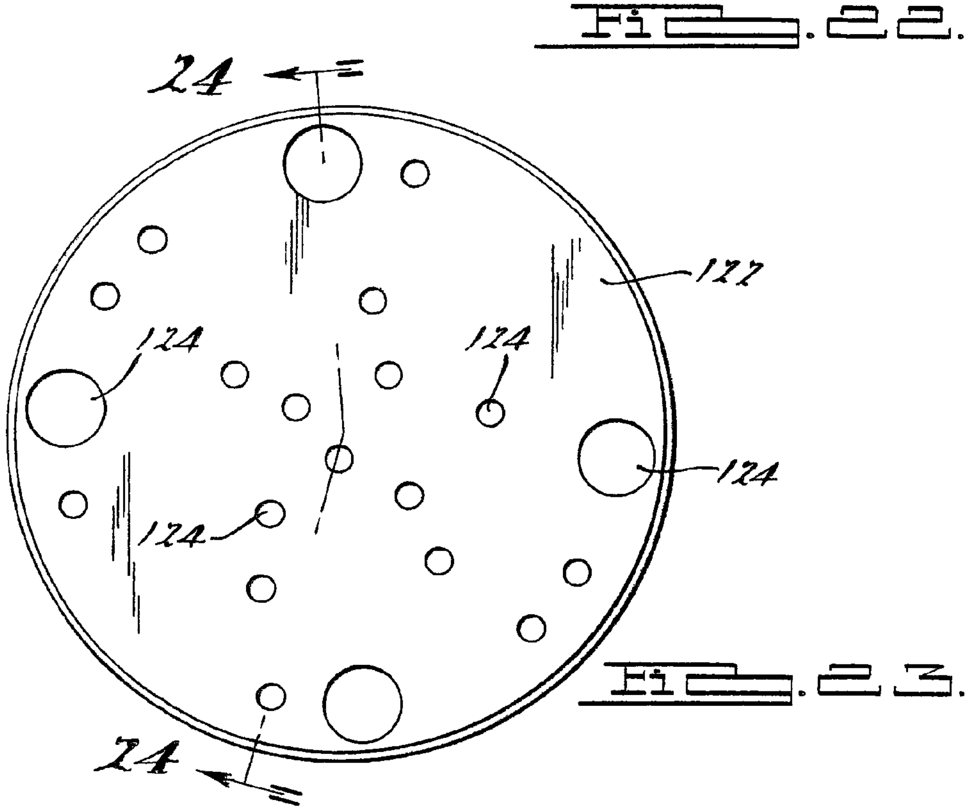
FIG. 23 shows a top view of the punch adaptor according to the present invention.
Figure 24:
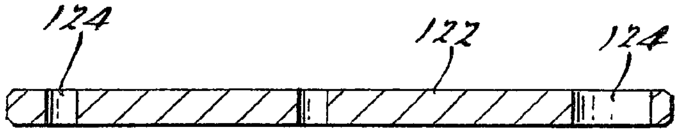
FIG. 24 shows a cross section of the punch adaptor taken along line 24-24 of FIG. 23.

FIG. 1 and FIGS. 21 and 22 show a punch backing member 120 according to the present invention. The punch backing member 120 is arranged adjacent to a punch adaptor 122 as shown in FIGS. 23 and 24. The punch adaptor 122 is engaged with a bottom portion of the lower clamp 94. The punch adaptor 122 generally has a disk like shape with a plurality of orifices 124 therethrough to mate with the lower clamp 94 and the punch backing member 120 on the opposite end thereof. The punch backing member 120 includes a locking flange 126 having a shoulder which will attach to a punch holder 128 on one end thereof and to the punch adaptor 122 on the opposite end. The punch backing member 120 provides a way of providing support to the back of the lower punch and proper alignment of the lower punch through a plurality of dowel pins and fasteners 130 or the like. It should be noted that any other type of pin, dowel or fastener may be used but dowel pins is used in the embodiment shown. The punch backing member 120 generally has an anvil like shape when looked in cross section as shown in FIG. 21. The upper portion has a ring like shape having a predetermined number of orifices 132 therethrough then a reduced radius portion is directly adjacent thereto followed by a slightly increased radial portion which forms a locking flange 126 for securing to the punch holder 128.

The punch holder 128 as shown in FIG. 1 and FIGS. 11 through 13 generally has a cylindrical shape. The punch holder 128 as a plurality of cavities 134 in a bottom portion thereof wherein the cavities 134 are either threaded or have other connection or fastening methods such that the punch holder 128 may be connected to a support member 142 on the bottom lower portion of the powdered metal press. Other members 144 are then connected to the support member 142 to provide for the necessary movement of the lower tool 54 of the powdered metal press. In the embodiment shown a threaded fastener 136 is used to connect the punch holder 128 and secure the punch holder 128 to the powdered metal press lower tool unit. The opposite end of the punch holder 128 includes a locking channel 138 that will interengage with the locking flange 126 of the punch backing member 120 to secure the punch backing member 120 to the punch holder 128. This will provide all of the necessary support for the two-piece lower punch during the compaction process for the powdered metal process. As discussed above all of the parts mentioned are generally made of a steel material however any other metal, ceramic, plastic, composite, or any other known or unknown material may be used depending on the design requirements for the powdered metal process.

A methodology of attaching the tools 40 to the press may be as follows, however any other known methodology may also be used. First, the inner bottom punch 78 is arranged and placed via the top end of the outer bottom punch 60 into the outer bottom punch 60. The inner bottom punch 78 is slid in the outer bottom punch 60 until the end of the plurality of grooves or channels 82 in the inner bottom punch 78 contact and engage the strengthening webs 68 of the outer bottom punch 60. The assembled two-piece bottom punch is then placed within the lower tool unit of the powdered metal press and the end of the inner bottom punch 78 extending from the outer bottom punch 60 is arranged within a clamping mechanism 90. The clamping mechanism 90 secures the bottom punch to the lower tool unit 54 via any known fastening technique such as the one described above. This will ensure proper alignment and positioning of the lower bottom punch with relation to the lower tool 54 in the process of the powdered metal compaction press. The upper punch 42 would then be installed along with the proper spacers and flanges along with the other flanges and die components around the lower bottom punch. Then the powdered metal composition press would be ready for the compaction process.

In operation during the compaction process the press as shown in the figures is in the open or pre-compaction position. During the powder metal process, powder will be filled into the die 56 and also into the unique scroll geometry of the outer portion of the bottom punch such that the powder contacts the top of the inner bottom punch 78 thus creating the desired shape and length for the compact or pre-sintered part. Once the powder is filled to the appropriate level in the die 56 either the lower punch or upper punch 42 will be moved in an axial direction to provide the necessary compaction forces thus compressing the material particles together as tightly as possible. Once the compaction is done the lower tool 54 will move in an upward direction towards the upper tool thus allowing the inner bottom punch to slide up and disengage the compact or pre-sintered part from the die 56. It should be noted that 15 to 60 tons per square inch of pressure are necessary in the compaction process thus the need for reliable, durable and strong parts in the tooling is necessary. The amount of time, force, tooling position and tooling deflections will be monitored during the compaction process and will be capable of adjustments by controllers operating the compaction press in the sinter metal compaction process.

It should be noted that other forms and methodologies of making the parts and installing the unique tooling into a compaction press may be used and even if not shown are covered by this disclosure even if such embodiments have only been contemplated by the inventor at the time of filing.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for assembling a two-piece punch into a tool for a powder metal process, said method including the steps of:

inserting a first lower punch into a second lower punch until a plurality of grooves in said first lower punch engage webs of said second lower punch;

arranging an end of said first lower punch in a clamping mechanism;

securing said first lower punch within said clamping mechanism; and securing said clamping mechanism to the tool.

2. The method of claim 1 wherein said inserting step includes said first lower punch inserted into a top end of said second lower punch.

3. The method of claim 1 wherein said step of securing said first lower punch includes having a plurality of locking members interacting between said first lower punch and said clamping mechanism.

4. The method of claim 3 wherein the clamping mechanism includes a clamp spike member having the plurality of locking members axially extending there from, an upper clamp member having a plurality of orifices, and a lower clamp member having a plurality of orifices.

5. The method of claim 4 wherein the clamp spike member is arranged between the upper clamp member and the lower clamp member.

6. The method of claim 5 wherein the plurality of locking members have angled surfaces that interact with angled surfaces of the upper clamp member and the lower clamp member.

7. The method of claim 6 wherein an interaction of the angled surfaces moves the plurality of locking members in a radial direction to engage the first lower punch to create a holding force between the first lower punch and the plurality of locking members and a locking surface of the clamping mechanism on the opposite side of the first lower punch.

8. The method of claim 1 wherein said first lower punch extends a predetermined distance from an end of said second lower punch.

9. The method of claim 1 further including a step of aligning the two piece punch with relation to the tool.

* * * * *